Figure 1:
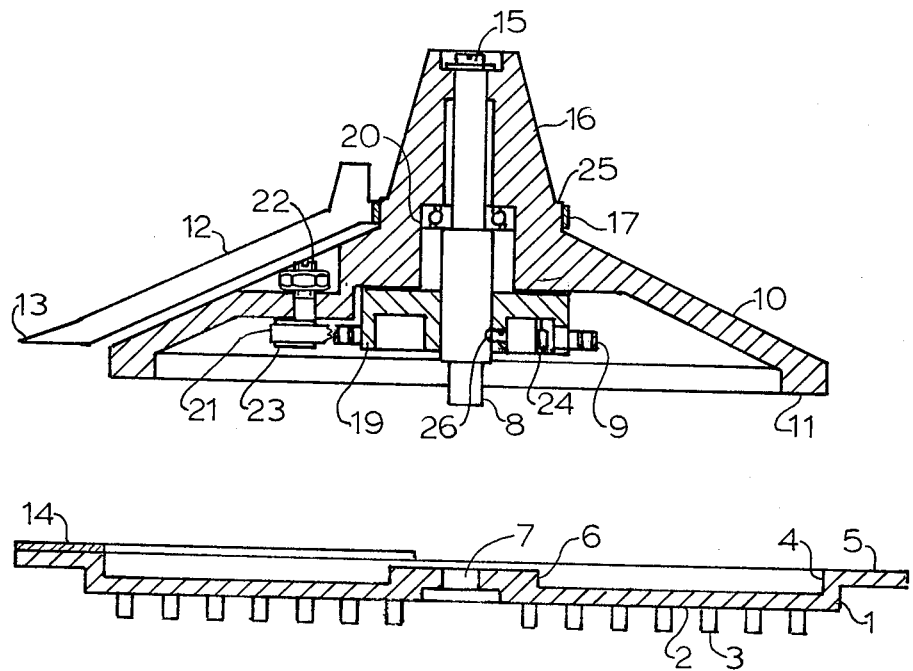

United States Patent [19]

Duffy

[11] 3,901,070

[45] Aug. 26, 1975

[54] MEASURING DEVICE

[75] Inventor: Geoffrey Graeme Duffy, Auckland, New Zealand

[73] Assignee: The University of Auckland, Auckland, New Zealand

[22] Filed: June 12, 1974

[21] Appl. No.: 478,693

[30] Foreign Application Priority Data

June 14, 1973 Australia.............................. 171062

[52] U.S. Cl. .................................................. 73/59
[51] Int. Cl.² ......................................... G01N 11/14
[58] Field of Search ............ 73/59, 60, 54; 162/198, 162/263

[56] References Cited
UNITED STATES PATENTS

| | | | |
|---|---|---|---|
| 2,269,305 | 1/1942 | Bell..................................... | 73/59 X |
| 2,360,546 | 10/1944 | Cardwell, Jr....................... | 73/59 X |
| 2,519,378 | 8/1950 | Kilpatrick ............................ | 73/59 |
| 2,657,572 | 11/1953 | Fann.................................... | 73/59 |
| 2,736,195 | 2/1956 | Christianson ....................... | 73/59 X |
| 3,079,788 | 3/1963 | Trotin.................................. | 73/59 |

Primary Examiner—Richard C. Queisser
Assistant Examiner—Joseph W. Roskos
Attorney, Agent, or Firm—Holman & Stern

[57] ABSTRACT

A measuring device for measuring the viscosity of a substance and more especially the disruptive yield strength of a fibre network such as paper pulp, the disruptive yield strength being linearly related to consistency or stock concentration of a fibre network, such as a paper pulp suspension, on a logarithmic scale. The device comprises an upper head member which is biased against rotation relative to a base member, the base member being provided with a plurality of outwardly extending pins, such that with the pins inserted into a substance such as a paper pulp suspension, and a torque being applied to the upper head member so as to rotate it relative to the base member, a value of torque, substantially proportional to the viscosity of the substance is reached at which the base member begins to rotate at the same speed as the upper member, said value of torque being determined by the position of the upper head member relative to the base member and which in turn provides a value of a viscosity co-efficient of the substance such as the disruptive yield strength of a paper pulp suspension.

8 Claims, 2 Drawing Figures

PATENTED AUG 26 1975

3,901,070

MEASURING DEVICE

This invention relates to a measuring device and more particularly to a device for measuring the viscosity of substances.

An object of this invention is to provide an improved device for measuring the viscosity of substances in a speedy yet efficient manner.

A further object of one embodiment of this invention is to provide a device which is suitable for use in measuring the viscosity co-efficient, called the consistency or stock concentration, of paper pulp suspensions.

Further objects of this invention will become apparent from the following description.

According to one aspect of this invention there is provided a device for measuring the viscosity of a substance comprising a base member, a plurality of pins provided in and projecting from an outer surface of said base member, an upper head member being provided and rotatably mounted relative to said base member, a spring being provided and mounted between said base and said head member, said spring biasing the head member against rotation relative to said base member, rotating means being provided whereby said head member is rotatable relative to said base member, measuring means associated with said head member, the arrangement being such that upon a torque being applied to said head member by movement of said rotating means, so as to rotate it, with said pins of said base member projecting into a substance, a value of torque, substantially proportional to the viscosity of the substance is reached, at which the base member will rotate at substantially the same speed as the head member, said value of torque being determined by the position of the head member relative to said base member and being measured by said measuring means.

Further aspects of this invention will become apparent from the following description, given by way of example of a preferred embodiment of the invention, and in which reference is made to the accompanying drawings, wherein:

FIG. 1: shows a part cross sectional, exploded view of a measuring device according to one embodiment of the invention.

Figure 2:
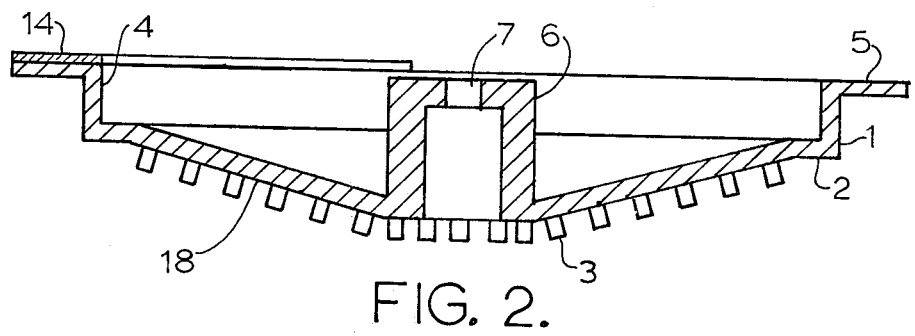

FIG. 2: shows a cross sectional view of an alternative base member for use with a measuring device according to a further embodiment of the invention.

In a preferred use of the measuring device according to this invention, the disruptive yield strength of a fibre network for example a paper pulp suspension, is measured, the disruptive yield strength being defined as the stress required to disrupt the fibre network permanently, and which depends in the case of a paper pulp suspension on the pulp species, pulp treatment during preparation and pulp history. The disruptive yield strength is linearly related to consistency or stock concentration of the paper pulp suspension on a logarithmic scale, the term consistency defining the ratio of the total mass of oven-dried solids to the total mass of the sample of pulp/water mixture, and is usually expressed as a percentage. For practical purposes, the total volume of pulp sample is generally substituted for the total mass and consistency is expressed as a percentage of the mass of solids in the total volume of sample. The measurement of the consistency of a paper pulp suspension is required throughout the wet end of a paper making machine and pulp mill, and especially where there are dilution and thickening operations required to be carried out.

Present method of measuring the consistency of a paper pulp suspension and the like fibre networks require a cumbersome and time consuming procedure, and the present invention is adapted so as to obviate the disadvantages inherent in the present methods.

Although this invention will be described in relation to the measurement of the disruptive yield strength of a paper pulp suspension or other fibre network, it could of course be used to measure the viscosity or like characteristics of any other like substance, the present invention enabling the distinguishing between different types of pulp, for example sulphite, sulphate, and ground wood, and also enables the monitoring of a composite pulp called a stock furnish.

Referring now to FIG. 1 of the accompanying drawings, a measuring device for measuring the disruptive yield strength of a suspension of pulp fibre in water or the like characteristics of any other like substance, comprises a base member 1 provided with an annular recess 4 and an outwardly extending, substantially horizontal peripheral flange portion 5. The base member 1 which may be of any suitable material, for example metal or alternatively may be moulded from a mouldable material, for example plastics, perspex, rubber or the like is provided with a plurality of downwardly depending pins 3, which pins may be formed integrally with the under surface 2 of the base member, for example moulded integrally therewith, during a moulding process, or alternatively, may be inserted into apertures provided on the under surface 2 of the base member, and secured therein. The pins 3 may be of any suitable material having the required characteristics of rigidity, and may, in one embodiment, be steel pins inserted, as aforesaid, into the under surface 2 of the base member 1. The base member 1 is also provided with an upwardly extending boss portion 6, an aperture 7 being provided in a substantially medial portion of the boss portion 6. A scale 14 is mounted, formed integrally, or otherwise provided around at least part of the peripheral portion of said base member 1, and along the flange 5 thereof. The scale 14 which is preferably linear, in a preferred use of the measuring device, indicates the disruptive yield strength of a fibrous network into which the pins 3 of the base member 1 are inserted, and as will hereafter be described.

An upper head member 10 is provided, of any suitable material, for example metal, plastics, rubber or the like, and has a substantially horizontal peripheral edge portion 11, which is adapted so as to fit within the annular recess 4 provided in the base member 1. The upper head member 10 is shown having a substantially frustro-conical shape or configuration, and is provided at a substantially central upper portion thereof with an annular portion 25 having an aperture through which a shaft 8 extends so as to project downwardly therefrom, the upper head member 10 being rotatable relative to the shaft 8. The shaft 8 is of a diameter substantially the same as that of the aperture 7 provided in the boss portion 6 of the base member 1, so as to fit securely and fixedly therein. A pointer 12 is shown securely mounted about the annular portion 25 of said upper head member 10, said pointer being provided with an elongate arm portion extending downwardly and substantially parallel with the sloping surface of said upper head member 10 and extending into an outwardly directed substantially horizontal portion 13, which in use, will slide over the upper surface of the scale 14. The pointer 12 is provided with an annular ring portion 17 which is fixedly mounted about an annular portion 25 of the upper head member 10 through which said shaft 8 passes, a bearing 20, for example a ball bearing being provided about the shaft 8 and within the annular portion 25. A serrated or knurled knob 16 is provided about the upper end of the shaft 8, a securing member 15, for example a screw, engaging with said shaft 8 at a distal end thereof so as to securely but rotatably mount said shaft 8 within the upper head arrangement as shown. A spring 9, having linear characteristics, for example a stainless steel spiral spring is provided and mounted adjacent a lower surface of said central portion of the upper head member 10, and is secured, at one end, in position around the shaft 8 by means of a slot 24 provided in a tubular spring mounting 19. The shaft 8 may be fixed relative to the spring mounting member 19 by means of a screw 26 if necessary. The spring 9 is provided at its other end with a projecting end portion 21, which engages with a cam 23 provided on an under surface of the upper head member 10 so as to bias the upper head member 10 against rotation relative to the base member 1, the boss portion 6 being adapted so as to fit securely and fixedly within the tubular spring mounting 19. The cam 23 is shown secured to a screw 22 passing through the upper head member 10 such that upon rotation of the screw 22 and hence the cam 23, the pointer 12 is able to be zeroed on the scale 14 of the base member.

The measuring device when assembled together, therefore has the upper head member 10 rotatably mounted within the annular recess 4 provided in the base member 1 and about the shaft 8, the spring mounting 19 and the boss portion 6 which are fixed in position relative to one another.

In use, the assembled measuring device is placed firmly on a well mixed suspension of pulp fibre in water or like substance, the pins 3 extending into the suspension. The edge 13 of the pointer 12 is zeroed on the scale 14 by means of the screw 22 and the cam 23 and torque is then applied to the knob 16 of the device, either manually, mechanically or electrically, at a slow but constant rate, with the suspension moving with the downwardly depending pins 3 until the suspension fails in a shear and the base member 1 moves at the same speed as the upper head member 10. The reading obtained by the position of the pointer edge 13 on the scale 14 at this elastic limit of the suspension provides the consistency as hereinbefore defined of the suspension. The torque indicated by the scale reading, at this point, provides the value of the disruptive yield strength of this particular fibre network which is linearly related to, on a logarithmic scale, the consistency of the network. As hereinbefore mentioned, the base member 1 could be rotated by an electric motor or the like, for example a synchronous motor, through a reduction gear box and flexible cable linkage arrangement. The maximum torque at shear, may be measured electrically, for example using an angle displacement transducer mounted on an upper portion of the shaft 8, and the measurement of the disruptive yield strength and thus the consistency of the pulp or the like, could in fact be a semi-continuous operation by means of batch sampling of the flow pulp or stock, for example using an over flow tank, this also overcoming velocity dependence problems.

Thus, the disruptive yield strength of a fibre network can be determined by the use of the device of the present invention and a calibration curve of disruptive yield strength against consistency enables the instrument reading to provide the consistency of the pulp suspension or the like, and the device may also be useful in composite pulp evaluation especially in the determination of the proportions of each species of pulp mixed therein.

Referring now to FIG. 2 of the accompanying drawings, a modified base member 1 is shown, reference numerals corresponding to those of FIG. 1 being used where appropriate, and has an outwardly depending substantially horizontal flange 5 provided with a scale 14, and as described with reference to FIG. 1. However, the base 2 of the base member 1 is provided with a substantially frustro-conical shape or configuration, the boss portion 6 having an aperture 7 for engagement with a shaft (8) of an upper head member (10), being provided at a substantially central portion as shown, the plurality of pins 3 depending outwardly from the substantially frustro-conical outer surface 18 of the base portion 2 of the base member 1.

Various alternative configurations for the base member 1 are envisaged, for example concave, convex, triangular or the like and the peripheral lower edge of the base member 1 adjacent the flange 5 may depend downwardly and for a greater distance than that shown in FIGS. 1 and 2, and may be provided with pins extending laterally therefrom, in a substantially horizontal plane, rather than in a substantially downward direction as shown in FIGS. 1 and 2.

By the use of springs (9) of varying strengths, consistencies can be measured for a fibrous network or other like substances throughout varying ranges, the weaker the spring 9 of course the lower the consistencies or yield strengths that can be accurately measured.

It has been found that the measuring device of the present invention is sensitive to changes in temperature, pH and chemical additions, and thus provides an accurate determination of the yield strength and thereby the consistencies of the paper pulp suspensions or the like to be measured.

Thus, by this invention there is provided a measuring device whereby the viscosity of a substance can be accurately determined, and which in a preferred use of the invention provides the disruptive yield strength and thereby the consistency of paper pulp suspensions and like fibrous networks.

Although this invention has been described by way of a preferred form, it is to be understood that modifications may be made thereto without departing from the scope of the invention as defined by the appended claims.

I claim:

1. A device for measuring the viscosity of a substance comprising a base member, a plurality of pins provided in and projecting from an outer surface of said base member, said base member being provided with a substantially central upwardly directed boss portion, an aperture provided in said boss portion, a head member being provided with, and rotatably mounted about, a downwardly depending substantially central shaft member, said shaft member being inserted within said aperture in said boss portion so as to rotatably locate said head member relative to said base member, a spring being provided and mounted between said base member and head member, said spring biasing the head member against rotation relative to said base member, indicating means being provided and associated with said head member so as to move with said head member, a scale being provided on said base member, the arrangement being such that upon torque being applied to the said head member to rotate it, with said pins of said base member projecting into a substance, a value of torque, substantially proportional to the viscosity of the substance is reached at which the base member beings to rotate at the same speed as the head member, said value of torque being indicated by the position of the indicating means relative to the scale on said base member.

2. A device as claimed in claim 1 in which said spring is a linear spring fixedly mounted about said shaft member, said spring being provided at one end thereof with a projection which engages with an abutment member provided on said head member.

3. A device as claimed in claim 1 in which said base member is provided with a lower surface of a substantially frustro-conical configuration, said pins extending outwardly from the outer surface thereof.

4. A device as claimed in claim 1 in which said pins project outwardly and laterally from said base member and from a substantially downwardly directed peripheral edge thereof.

5. A device for measuring the viscosity of a substance comprising a base member, a plurality of pins provided in and projecting from an outer surface of said base member, an upper head member being provided and rotatably mounted relative to said base member, a spring being provided and mounted between said base and said head member, said spring biasing the head member against rotation relative to said base member, rotating means being provided whereby said head member is rotatable relative to said base member, a pointer rotatably movable with said head member and extending outwardly from an edge of said head member so as to be movable adjacent a scale provided on an upper face of said base member, the arrangement being such that upon a torque being applied to said head member by movement of said rotating means, so as to rotate it, with said pins of said base member projecting into a substance, a value of torque substantially proportional to the viscosity of the substance is reached, at which the base member will rotate at substantially the same speed as the head member, said value of torque being determined by the position of the head member relative to said base member and being measured by the position of said pointer along said scale.

6. A device for measuring the viscosity of a substance comprising a base member, a plurality of pins provided in and projecting from an outer surface of said base member, an upper head member being provided and rotatably mounted relative to said base member, a spring being provided and mounted between said base and said head member, said spring biasing the head member against rotation relative to said base member, a motor being provided whereby said head member is rotatable relative to said base member, a transducer which determines the angle of displacement of said head member relative to said base member being associated with said head member, the arrangement being such that upon a torque being applied to said head member by movement of said rotating means, so as to rotate it, with said pins of said base member projecting into a substance, a value of torque, substantially proportional to the viscosity of the substance is reached, at which the base member will rotate at substantially the same speed as the head member, said value of torque being determined by the position of the head member relative to said base member and being measured by said transducer.

7. A device as claimed in claim 6 in which said base member is provided with a lower surface of a substantially frustro-conical configuration, said pins extending outwardly from the outer surface thereof.

8. A device as claimed in claim 6 in which said pins project outwardly and laterally from said base member and from a substantially downwardly directed peripheral edge thereof.

* * * * *

UNITED STATES PATENT OFFICE
CERTIFICATE OF CORRECTION

PATENT NO. : 3,901,070
DATED : August 26, 1975
INVENTOR(S) : Geoffrey Graeme Duffy It is certified that error appears in the above-identified patent and that said Letters Patent are hereby corrected as shown below.

[30] Foreign Priority Data:

New Zealand No. 171062 filed June 14, 1973

Signed and Sealed this eleventh Day of November 1975

[SEAL]

Attest:

RUTH C. MASON
Attesting Officer

C. MARSHALL DANN
Commissioner of Patents and Trademarks